Oct. 25, 1960   R. G. TAYLOR, JR   2,957,233
CASING PROTECTOR TRANSFER SLEEVE
Filed Feb. 1, 1957   4 Sheets-Sheet 1

INVENTOR.
RAYMOND G. TAYLOR, JR.
BY
Allen C. Hambly
ATTORNEY.

Oct. 25, 1960 R. G. TAYLOR, JR 2,957,233
CASING PROTECTOR TRANSFER SLEEVE
Filed Feb. 1, 1957 4 Sheets-Sheet 2
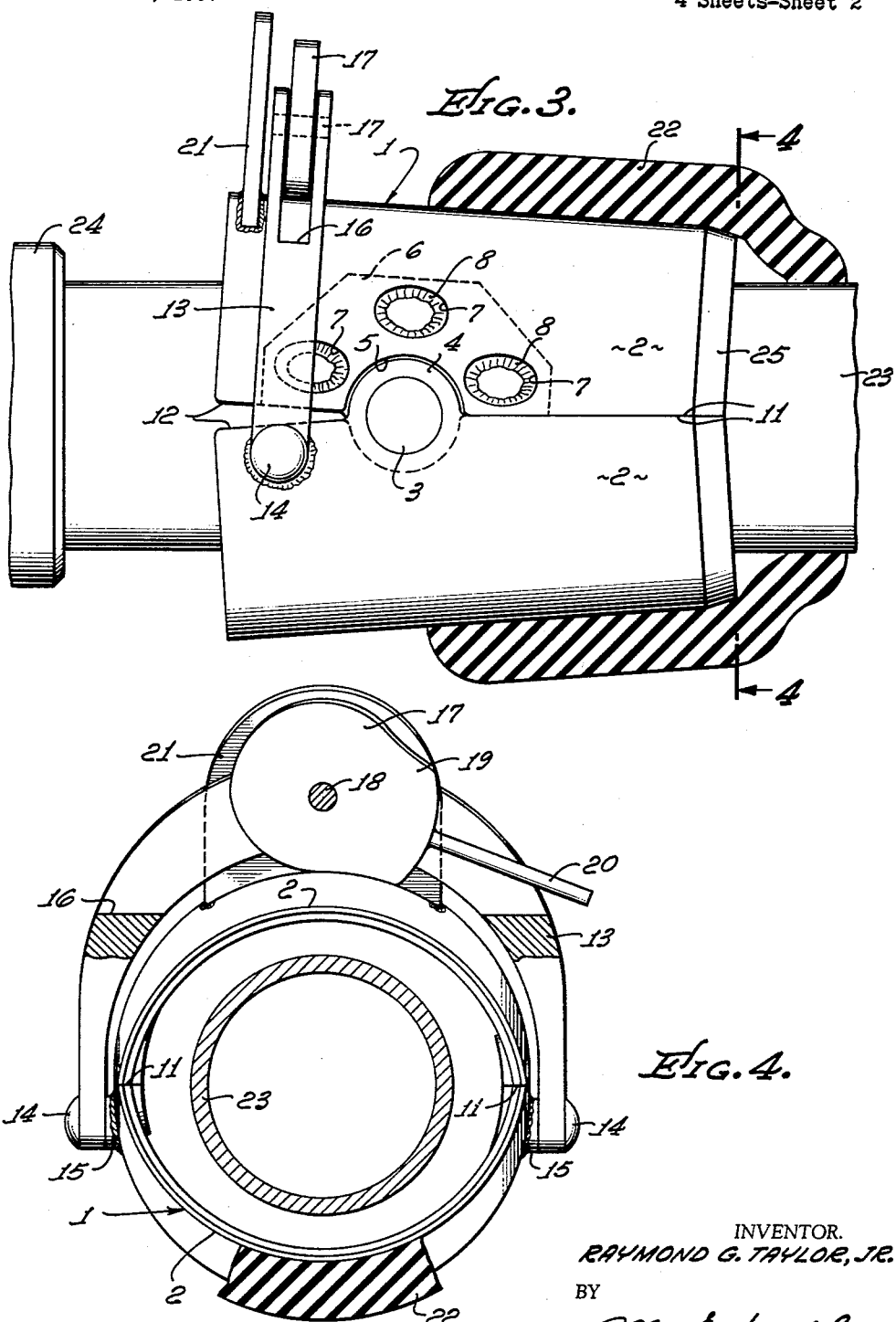
INVENTOR.
RAYMOND G. TAYLOR, JR.
BY
Allen E. Hambly
ATTORNEY.

Oct. 25, 1960                R. G. TAYLOR, JR                2,957,233
                       CASING PROTECTOR TRANSFER SLEEVE
Filed Feb. 1, 1957                                    4 Sheets-Sheet 3
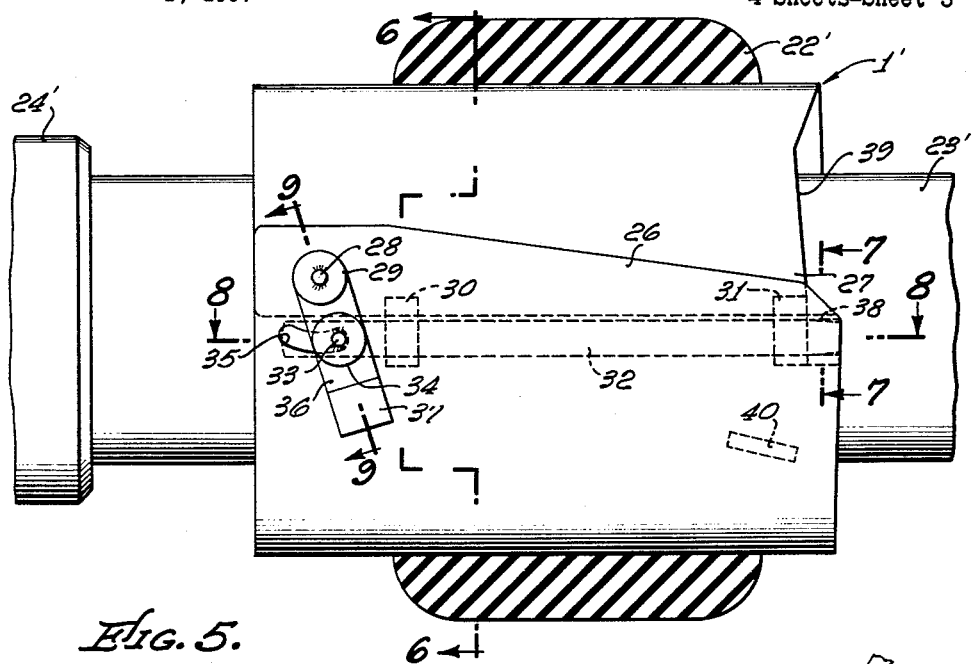
Fig. 5.
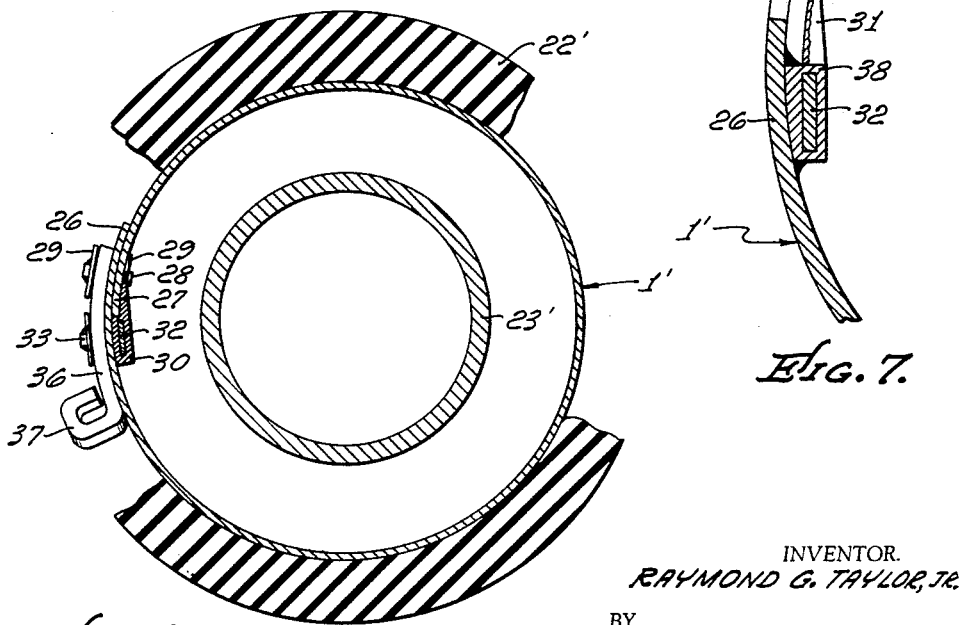
Fig. 6.
Fig. 7.
INVENTOR.
RAYMOND G. TAYLOR, JR.
BY
Allen E Hambly
ATTORNEY.

Oct. 25, 1960 R. G. TAYLOR, JR 2,957,233
CASING PROTECTOR TRANSFER SLEEVE
Filed Feb. 1, 1957 4 Sheets-Sheet 4
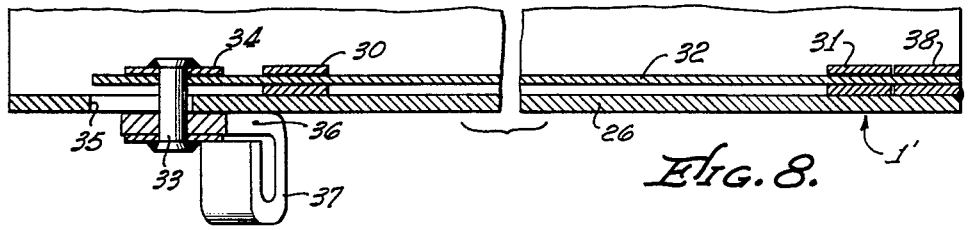
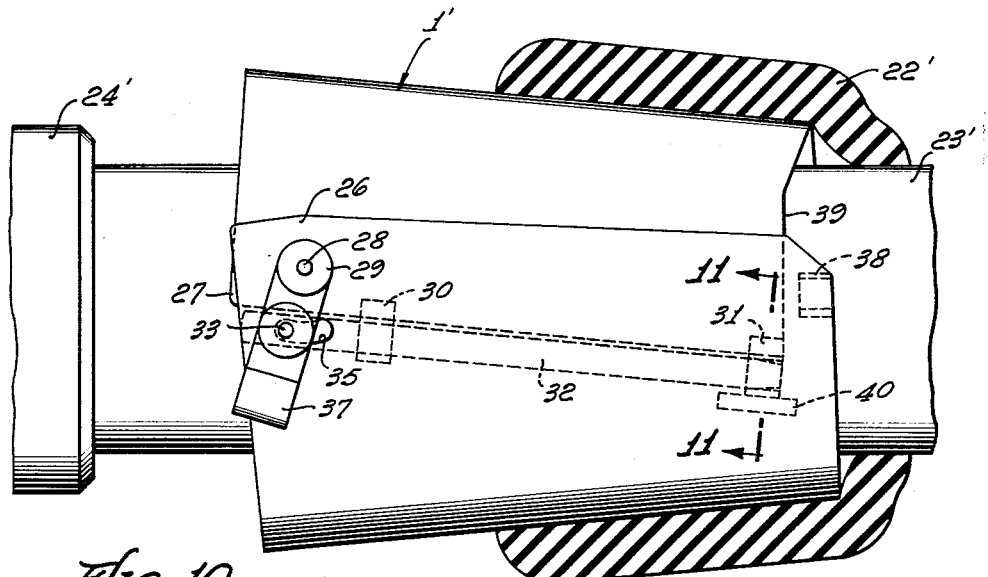
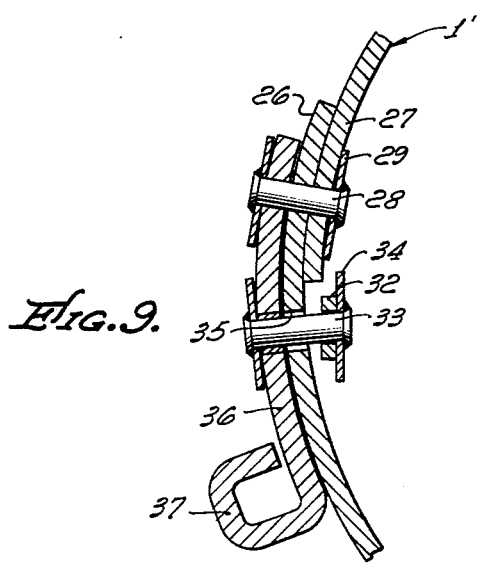
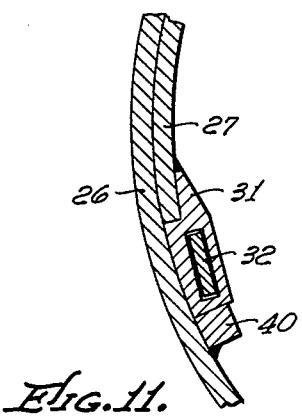
INVENTOR.
RAYMOND G. TAYLOR, JR.
BY
ATTORNEY.

United States Patent Office 2,957,233
Patented Oct. 25, 1960

2,957,233

CASING PROTECTOR TRANSFER SLEEVE

Raymond G. Taylor, Jr., Santa Monica, Calif., assignor to Borg-Warner Corporation, Chicago, Ill., a corporation of Illinois Filed Feb. 1, 1957, Ser. No. 637,817

6 Claims. (Cl. 29—236)

The present invention relates to a transfer sleeve for casing protectors and more particularly to a transfer sleeve of an improved structure which facilitates the application of the casing protectors to a casing from the transfer sleeve.

In the art of rotary well drilling, it has become common practice to provide a rubber or rubber-like protector collar at intervals on the drill pipe or casing in order to reduce wear of the drill pipe or casing and the connections thereof which are known as tool joints or couplings. The protector collars are usually composed of natural or synthetic rubber or rubber compound. These protectors are ordinarily of annular form and encircle the pipe to be protected.

In order that the protector collars may tightly grip the pipe or casing to thereby prevent slippage, they are initially formed with an internal diameter substantially smaller than the external diameter of the casing or pipe to which they are adapted to be applied. Accordingly, it is necessary that the protectors be expanded substantially for application to the casing, it being necessary that the protectors be expanded so that they may be passed over the enlarged tool joints or couplings of the pipe or casing.

Casing protectors, as they have now developed in the art, are provided in a range of sizes to fit the various sizes of drill pipes commonly employed, and when such protectors are to be stretched upon a casing or pipe, a protector is selected which has a relaxed size such that it must be stretched approximately 100% so as to fit upon the casing or pipe. Depending upon the diameter of the casing or pipe, the thickness of the protectors from their inside to their outside diameters may range from ¾" upwards to 2" or more. Thus, to sufficiently stretch a protector having a relaxed diameter on the order of 2½" to a condition where the protector has a diameter on the order of approximately 5" and beyond requires a great deal of force.

It has become somewhat standard practice to employ a special power-operated tool for stretching rubber or similar casing protectors or collars onto a cylindrical transfer sleeve having an inside diameter greater than the diameter of the tool joints or couplings of a pipe or casing to which the protector is to be applied. The protectors are installed upon a casing or pipe by disposing the transfer sleeve thereabout and pushing the protector off of the sleeve with a suitable push-off device.

A general object of the present invention is to provide a relatively simple and efficient transfer sleeve which facilitates the installation of casing protectors on the pipe or casing without necessitating the employment of special push-off tools as aforesaid.

Another object in accordance with the aforesaid general objective, is to provide a transfer sleeve which is adapted to assume a generally cylindrical form, and to be retained in such form so as to enable the application of a casing protector thereto and the frictional retention of the protector thereon, the transfer sleeve being so constructed that it will assume a tapered form whereby the energy stored in the protector device will effect removal of the transfer sleeve from within the protector.

Another object of the invention is to provide a transfer sleeve which generally comprises a plurality, preferably a pair, of semi-cylindrical body half-sections having terminal portions hingedly interconnected in abutting relation so as to provide a generally tubular body, the half-sections being provided at one end with latch means for holding the body sections in a condition where the tubular body is cylindrical, but with the opposing terminal surfaces of the body half-sections being tapered in such a manner that when the latching means is released, a casing protector disposed about the sleeve will cause the body half-sections to swing about the hinged connection until the tapered terminal surfaces abut with one another and the sleeve is generally frusto-conical in form.

As the result of the sleeve's assuming the tapered or frusto-conical form, the stress stored up in the protector and acting upon the inclined outer periphery of the sleeve (in a manner determined by the angle of taper of the sleeve, the energy stored in the protector, and frictional resistance to movement of the protector) will exert an axial component of force which will move the sleeve out of the protector, thus enabling the protector to contract about a casing or pipe. In practice soap or other lubricant will be applied to the transfer sleeve to reduce frictional resistance and facilitate removal of the protector from the sleeve.

Another specific object of the invention is to provide a transfer sleeve in accordance with the aforesaid general objective wherein the sleeve is composed of a continuous body element of sheet metal having terminal portions and folded or arched back upon itself so that the terminal portions are overlapped, thus providing a cylindrical body, the body having means for retaining said overlapping portions in such a position with respect to one another that the body retains the generally cylindrical configuration upon which a casing protector may be placed; and whereby upon release of the retaining means, one end of the sleeve body will be substantially reduced in diameter responsive to a wrapping movement at one end of the body, while at the other end of the body, a pivot pin is provided for preventing overlapping or wrapping of this end of the body, whereby the body assumes substantially a frusto-conical form enabling the stress or energy stored in the protector to force the transfer sleeve from within the protector, as previously mentioned.

Other objects and advantages of the invention will be hereinafter described or will become apparent to those skilled in the art, and the novel features hereof will be defined in the appended claims.

In the accompanying drawings:

Fig. 3 is a view similar to Fig. 1, but showing the transfer sleeve in frusto-conical form with the protector partially removed from the sleeve;

Fig. 4 is a view in section, as taken on the line 4—4 of Fig. 3, with a portion of the protector broken away to better reveal the latch mechanism;

Fig. 5 is a view similar to Fig. 1 showing another form of transfer sleeve embodying the invention;

Fig. 6 is a view in section, as taken on the line 6—6 of Fig. 5, with a portion of the protector broken away to better reveal the latch mechanism;

Fig. 7 is an enlarged fragmentary view in section, as taken on the line 7—7 of Fig. 5;

Fig. 8 is an enlarged fragmentary view in section, as taken on the line 8—8 of Fig. 5;

Fig. 9 is an enlarged fragmentary view in section, as taken on the line 9—9 of Fig. 5;

Fig. 10 is a view similar to Fig. 5, but showing the transfer sleeve in a frusto-conical form with the protector partially removed from the sleeve; and Fig. 11 is an enlarged fragmentary view in section, as taken on the line 11—11 of Fig. 10.

Like reference characters in the several figures of the drawings and in the following description designate corresponding parts.

Figure 1:
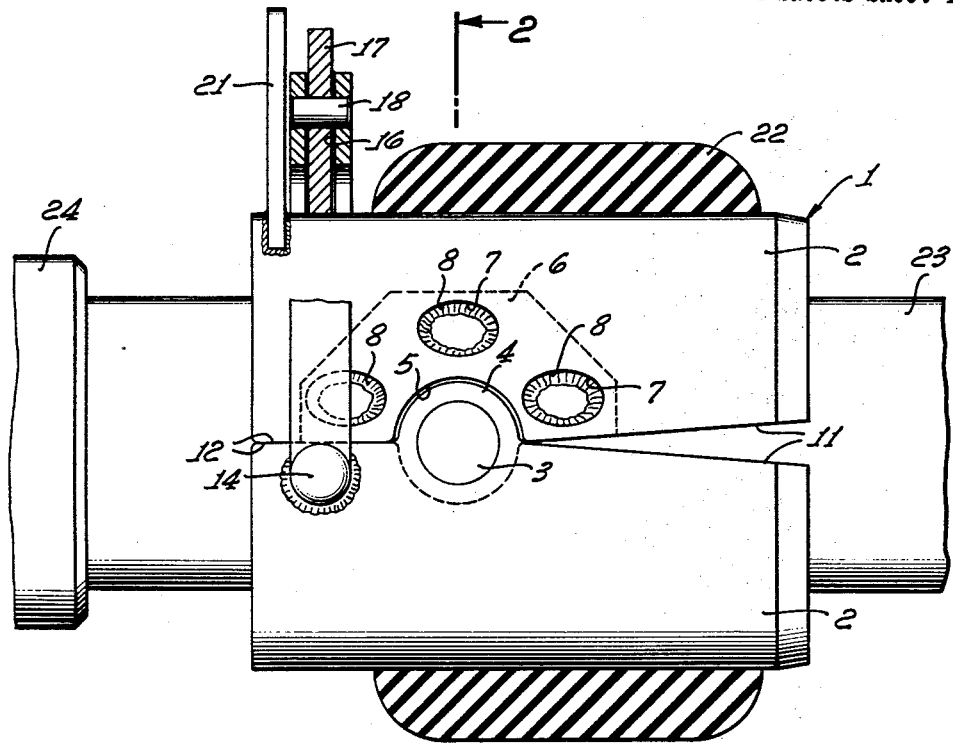
Fig. 1 is a view partly in elevation and partly in section, showing a transfer sleeve embodying the invention with a casing protector disposed thereon, and with a section of casing or pipe extending through the sleeve.
Figure 2:
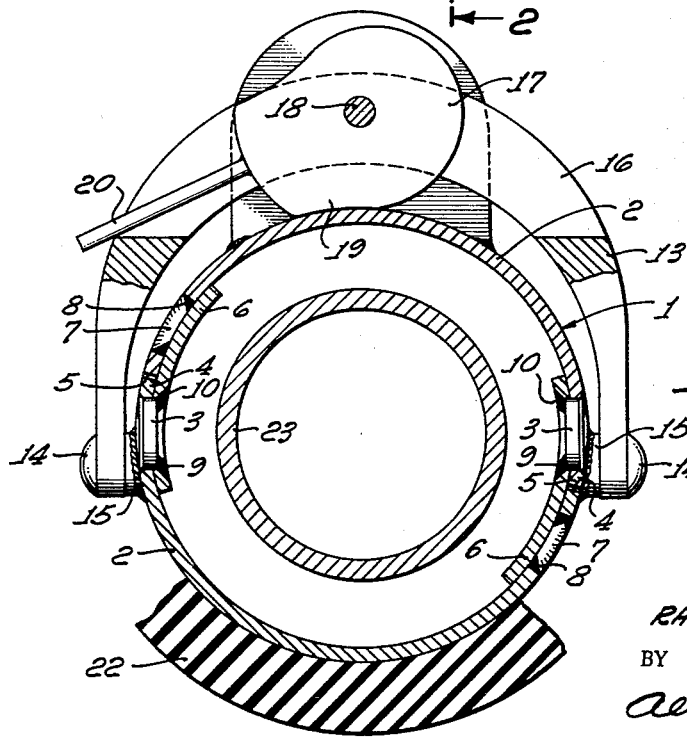
Fig. 2 is a view in section, as taken on the line 2—2 of Fig. 1, with a portion of the protector broken away to better reveal the latch construction.

Referring particularly to Figs. 1 and 2, 1 generally denotes a transfer sleeve embodying the invention. The sleeve 1 is composed of a plurality of similar body sections 2. Preferably the body is composed of a pair of such sections 2, although any desired number may be employed. In the illustrative form, the 2 half-sections are shown as having adjacent marginal or terminal portions abutting on a diametrical plane extended axially of the sleeve. Means are provided for hingedly interconnecting the sections 2 together on this diametrical plane. Preferably such hinge means includes a pair of diametrically opposed trunnions 3, which are respectively carried by one body section 2 and pivotally connected to the other body section 2.

In order to accommodate the trunnions 3, each body section at a point intermediate its ends is provided with a circumferentially projecting ear 4 having an arcuate outer periphery. In addition, each body section 2 is also provided with an arcuate depression 5 into which the ears 4 project when the half-sections are disposed in assembled relation. Thus, the body sections 2 are identical in form which facilitates their manufacture.

Secured to the inside wall of each of the body sections 2 is a trunnion supporting plate 6, each plate 6 being arcuate so as to closely fit the body section 2 by which it is carried. The plates 6 may be secured to the body sections 2 in any suitable manner, but preferably this is accomplished by providing a number of holes 7 through the body sections 2 in overlying relation to the plate 6 and applying a bead of welding 8 in the holes 7 to the surface of the plates 6.

The ears 4 provide terminal portions overlapping the plates 6 and the trunnions 3 are preferably secured to the respective supporting plates 6 as by welding at 9 within an opening 10 formed in the respective plates 6. The trunnions 3 project through an opening in the respective plates 6 and are preferably bezelled at their outer extremities for interlocking the trunnions to the body sections 2, while allowing free pivotal movement of the body sections about the trunnions.

The opposing edge faces 11 of the adjacent terminal portions of the body sections 2, extending in one direction from the hinged connection of the body sections to the extreme end of the sleeve, are angularly disposed or tapered so that the opposing faces diverge towards said end, thus enabling movement of the body sections 2 about the trunnions 3 so that the sleeve 1 may assume either a purely cylindrical form as shown in Fig. 1, or alternatively may assume a tapered or frusto-conical form as seen in the Fig. 3, the taper of the body of the sleeve being determined by the angle of the faces 11.

In order to retain the body sections 2 in the positions shown in Fig. 1 with the sleeve 1 in a cylindrical form, means are preferably provided for latching or retaining the body sections 2 in such positions, with the opposing edge faces 12 of the body sections 2 disposed in abutting contact, these faces extending axially in the opposite direction from the trunnions 3 as compared with the previously described faces 11. Such latch means preferably comprises a generally U-shaped yoke 13 which is pivotally connected at its ends as by means of pivot pins 14 to one of the body sections 2, the pivot pins 14 being suitably supported in supporting elements 15 which are welded or otherwise suitably secured to the just-mentioned body section 2.

The yoke 13 is preferably slotted as at 16 so as to receive a rotatable cam 17 which is mounted in the slot 16 for pivotal movements upon a rivet 18 or the like. The periphery of the cam 17 is eccentric with relation to the axis of rotation of the cam so that when the cam is in the position shown in Fig. 2, the cam will act upon the adjacent body sections 2 of the sleeve 1, and upon the yoke 13 to hold the faces 12 of the body sections 2 in engagement with the sleeve in a cylindrical form.

The cam 17 preferably is provided with a holding section 19 on a curve having a radius corresponding to the radius of the outside surface of the cylindrical sleeve. At the center of the holding section 19 is a suitable operating arm or member 20 welded or otherwise secured to the cam 17. A radially projecting guard plate 21 may be welded or otherwise secured to the outer periphery of the sleeve 1 so as to overly the cam 17 and assist in maintaining the yoke 13 in an operative position.

In practice, with the sleeve 1 in a cylindrical form as shown in Fig. 1, a rubber or rubber-like casing protector 22 will be applied to the sleeve 1, in a manner which is well known in the art, as by the use of a conventional machine. When the protector is being expanded for application to the sleeve, it will be stretched upwards to approximately three times its normal diameter since the transfer sleeve 1 must be of such size as to not only encircle a drill pipe, as shown at 23, at its normal diameter; but the transfer sleeve 1 must also be of such a size as to pass over a tool joint or coupling on the casing or pipe 23 as is illustrated at 24.

Accordingly, substantial energy is stored in the casing protector 22, tending to rock the body sections 2 of the transfer sleeve about the trunnions 3. Upon rotation of the cam 17 from the position shown in Figs. 1 and 2 to that shown in Figs. 3 and 4, the body sections 2 of the transfer sleeve 1 will be permitted to swing about the trunnions 3 to the positions shown in Figs. 3 and 4 with the edge faces 11 contacting one another and with the sleeve 1 in a generally tapered or frusto-conical form. When the sleeve 1 assumes such a form, an axial component of force will be produced by the hoop stress in the protector 22 so that the protector 22 will force the sleeve 1 axially therefrom. In order to reduce frictional resistance to this action, a lubricant or soapy material is employed between the protector 22 and the outer surface of the sleeve 1. During such removal of the sleeve from the protector 22, the protector will initially contact and frictionally engage the casing or pipe as shown in Fig. 3, and thereafter the sleeve 1 will be rapidly pushed from the protector 22 which will fit itself snugly upon the casing or pipe 23.

Removal of the sleeve 1 from the protector 22 to some extent is dependent upon the angle of taper of the sleeve, and the greater the angle of taper, the greater the effect of the hoop stress in the collar in producing the axial force aforementioned. In order to facilitate this action, the end portion of the sleeve 1 may be bevelled as at 25, thus providing a rather sharply inclined surface against which the hoop stress in the protector 22 may act.

Referring now to the form of the invention as shown in Figs. 5 through 11, the transfer sleeve is designated generally 1', and includes a continuous sheet metal body having longitudinally extended, circumferentially overlapped, terminal portions 26 and 27. The overlapping portions 26 and 27 are preferably pivotally or hingedly interconnected as by means of pivot pin 28 or the like extending therethrough adjacent to the end of the body 1' and having enlarged washers 29 which are welded or otherwise secured at its opposite ends. Accordingly, the terminal portions 26 and 27 of the sleeve body 1' are free to move about the pivot pin 28 and the inherent flexibility of the sheet metal will enable a spiral-like wrapping effect to be produced in the body 1' whereby the body will assume a tapered or frusto-conical form, responsive to the pressure applied thereto by a protector.

Secured in axially spaced positions interiorly of the body 1' are a pair of guides 30 and 31, these guides being carried by the terminal portion 27 previously referred to which is overlapped by the terminal portion 26 and are adapted to support for reciprocal movements an axially extended latch pin 32 which extends through appropriately formed openings in the guides.

At one end, the latch pin 32 is provided with an opening in which a pin 33 is mounted, the pin 33 preferably having an enlarged washer 34 welded thereto and the latch pin 32 being pivotally mounted upon the pin 33 between the washer 34 and the inner surface of the terminal body portion 26. The pin 33 projects radially through a generally longitudinally arched slot 35 in the terminal portion 26 of the body 1'.

At the outer end of the pivot pin 33, it is pivotally mounted in an operating lever or arm 36 at approximately the midpoint of the latter. One end of the arm 36 is pivotally connected to the pivot pin 28 previously referred to, to enable a rocking movement of the arm 36 thereabout. The other end of the arm 36 is suitably formed as at 37 to provide a gripping portion to facilitate manipulation of the arm or to enable the tapping of the arm with a hammer or other tool. Accordingly, pivotal movement of the arm 36 about the hinge or pivot pin 28 will effect axial reciprocation of the latch pin 32 in the guides 30 and 31.

In order for the latch pin 32 to retain the body 1' in a cylindrical form, the overlapping terminal portion 27 of the body 1' is provided adjacent the opposite end thereof from the hinge pin 28 with a latch-pin receiving-socket element 38 which may be welded or otherwise suitably secured to the inner surface of the terminal portion 26 aforesaid. For accommodating the latch socket element 38 and to prevent interference thereof with wrapping movements of the terminal body portions 26 and 27, the adjacent end of the terminal body portion 27 is preferably cut back as at 39 to provide a clearance. With the latch pin 32 extending through the guides 30 and 31 and into the socket element 38, the sleeve body 1' will be retained in a cylindrical form as shown in Fig. 5 so that a resilient protector 22' may be installed thereon. The assembled sleeve and protector may then be disposed upon the casing or pipe 23', there being sufficient space therebetween to enable the sleeve 1' to be passed over the enlarged tool joint or coupling designated 24', all as is customary in the use of conventional casing protector transfer sleeves, as has been previously described.

However, when the operating arm or lever 36 is moved in a clockwise direction about its pivot 28, as viewed in Figs. 5 and 10, the latch pin 32 will be moved axially and removed from the socket element 38, and the compressive action of the protector will cause a wrapping of the overlapping terminal portions 26 and 27 of the sleeve body 1' as the result of their being pivotally connected to the pin 28. The sleeve body 1' will accordingly assume a tapered or frusto-conical form as in Fig. 10 and the hoop stress in the protector 22' will exert an axial component of force upon the sleeve 1', thereby forcing the same axially from within the protector 22', just as in the case of the structure shown in Figs. 1 through 4.

For limiting the wrapping action of the body 1', an abutment piece or stop 40 is preferably welded or otherwise suitably secured on the inner surface of the overlapping terminal portion 26. Thus, the edge of the terminal portion 27 underlying the portion 26 will engage the stop so that the body 1' will not grip the casing itself.

In the light of the foregoing, it will now be apparent that an improved transfer sleeve for casing protectors and the like has been provided by virtue of the present invention. The improved transfer sleeve hereof has all the advantages of previously-known transfer sleeves, but in addition facilitates the application of protectors to casing or pipes without requiring special tools or equipment to remove the protectors from the sleeves, since this is accomplished automatically and virtually instantaneously upon release of the retaining means which hold the sleeve in a cylindrical form.

While the specific details of two illustrative embodiments have been herein shown and described, the invention is not limited to such details alone, since changes and alterations may be resorted to without departing from the spirit thereof as defined in the appended claims.

I claim:

1. A transfer sleeve of the class described for applying resilient protectors to a casing or pipe, comprising an axially extended hollow body, said body comprising a strip arched back upon itself and having its opposite terminal portions overlapped, means pivotally interconnecting said overlapping terminal portions for allowing said body to be flexed from a normal cylindrical form to a frusto-conical form, means for releasably retaining said body in said cylindrical form, said retaining means includes a latch pin shiftably carried by one of said overlapping terminal portions, latch pin receiving means on the other terminal portion for releasable engagement by said latch pin, and operating means for shifting said latch pin into and out of engagement with said latch pin receiving means.

2. A transfer sleeve of the class described for applying resilient protectors to a casing or pipe, comprising an axially extended hollow body, said body comprising a strip arched back upon itself and having its opposite terminal portions overlapped, means pivotally interconnecting said overlapping terminal portions for allowing said body to be flexed from a normal cylindrical form to a frusto-conical form, means for releasably retaining said body in said cylindrical form, said retaining means includes a reciprocatable latch pin extending longitudinally of said body, means on one of said terminal portions for slidably supporting said latch pin, and a latch pin receiving element on the other terminal portion adjacent to the opposite end of said body from said pivotal interconnecting means, and means for shifting said latch pin into and out of engagement with said latch pin receiving element.

3. A transfer sleeve of the class described for applying resilient protectors to a casing or pipe, comprising an axially extended hollow body, said body comprising a strip arched back upon itself and having its opposite terminal portions overlapped, means pivotally interconnecting said overlapping terminal portions for allowing said body to be flexed from a normal cylindrical form to a frusto-conical form, means for releasably retaining said body in said cylindrical form, said retaining means includes a latch pin shiftably carried by one of said overlapping terminal portions, latch pin receiving means on the other terminal portion for releasable engagement by said latch pin, and operating means for shifting said latch pin into and out of engagement with said latch pin receiving means, said operating means comprising an arm pivotally mounted upon said pivotal interconnecting means, said arm being connected to said latch pin for shifting the same upon pivotal movement of said arm.

4. A transfer device as defined in claim 6, wherein one of said terminal portions is provided with a stop disposed adjacent to the opposite end of said sleeve from said rigid element, said stop means being disposed in the path of the other terminal portions for limiting overlapping movement thereof.

5. A transfer device of the class described for applying resilient protectors to a casing or pipe, comprising an axially extended hollow body, said body comprising a metallic strip arched back upon itself and having its opposite terminal portions overlapped, a pin extending through said overlapped portions adjacent one end of said body, a lever pivoted on said pin externally of said body, a latch pin extending longitudinally of the body interiorly thereof, means carried by one overlapping portion slidably supporting said latch pin in the body, means on the other overlapping portion engageable by said latch pin for holding the body in a cylindrical form, and a member projecting through said body and interconnected with said lever and said latch pin for shifting said latch pin longitudinally of the body into and out of engagement with the latter means responsive to pivotal movement of said lever.

6. A device for installing annular elastic protectors on drill pipe or casing comprising an elongated cylindrical sleeve adapted to receive an elongated, expanded, elastic protector, the external diameter of the sleeve being greater than the internal diameter of the protector so that the protector is substantially tensioned about the sleeve, said sleeve being longitudinally split at one side of the sleeve and having overlapping terminal portions, means at one side of the tranverse center of said sleeve including a rigid element cooperatively engaged with said overlapping terminal portions for preventing uniform contraction of the sleeve whereby said sleeve will assume a tapered form upon contraction, and means for releasably retaining said sleeve against contraction, said retaining means comprising a latch pin shiftably carried by one of said terminal portions, a latch pin receiving element on the other of said terminal portions, and means for shifting said latch pin into and out of engagement with said latch pin receiving element.

References Cited in the file of this patent

UNITED STATES PATENTS

| | | |
|---|---|---|
| 232,223 | Adkerson | Sept. 18, 1880 |
| 1,013,349 | Whitty | Jan. 2, 1912 |
| 1,110,136 | Hundhausen | Sept. 8, 1914 |
| 1,411,292 | Mueller | Apr. 4, 1922 |
| 1,430,702 | Troutman | Oct. 3, 1922 |
| 2,145,806 | Schnedarek | Jan. 31, 1939 |
| 2,263,778 | Howard | Nov. 25, 1941 |
| 2,294,506 | Long | Sept. 1, 1942 |
| 2,541,963 | Hendrix | Feb. 13, 1951 |
| 2,694,853 | Miller et al. | Nov. 23, 1954 |

FOREIGN PATENTS

| | | |
|---|---|---|
| 380,017 | Great Britain | Sept. 8, 1932 |